Dec. 17, 1946.  J. A. SMITH  2,412,756
SPACING AND POSITIONING DEVICE FOR REFRIGERATING APPARATUS
Filed June 5, 1944
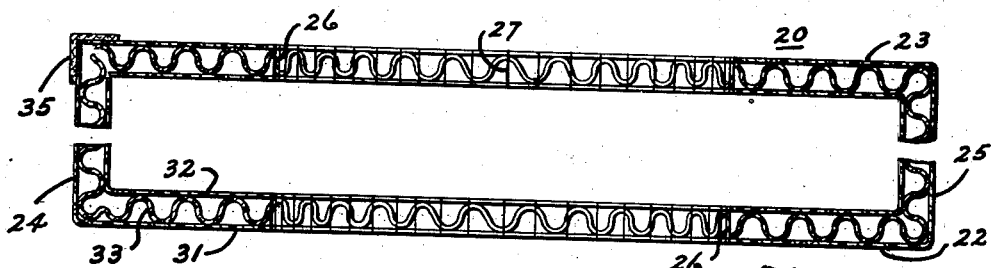
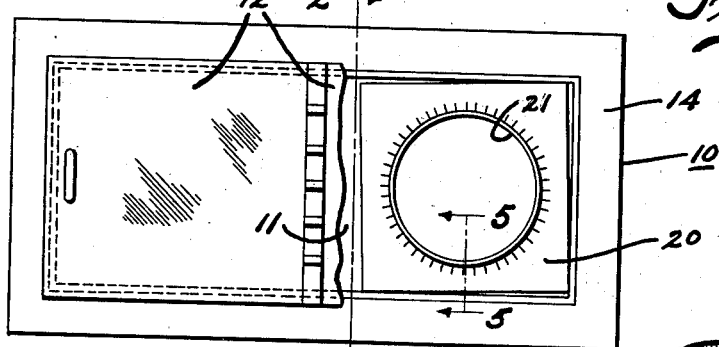
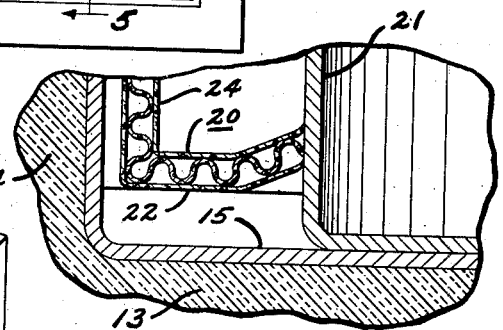
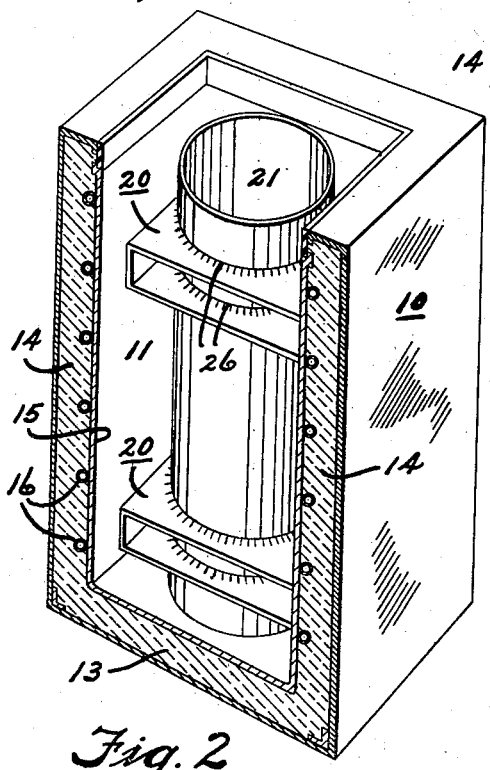
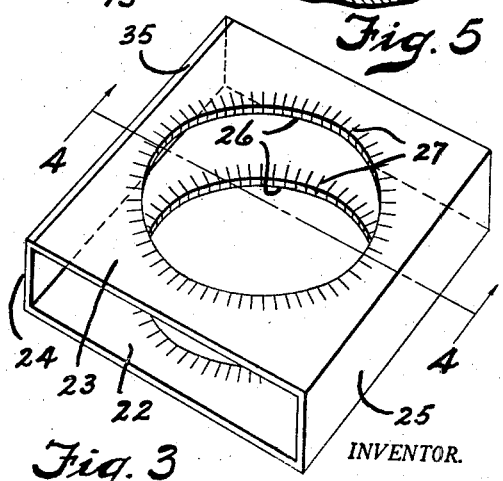
INVENTOR.
BY JASPER A. SMITH.

Patented Dec. 17, 1946

2,412,756

UNITED STATES PATENT OFFICE 2,412,756

SPACING AND POSITIONING DEVICE FOR REFRIGERATING APPARATUS

Jasper A. Smith, Oakwood, Ohio, assignor to General Motors Corporation, Dayton, Ohio, a corporation of Delaware Application June 5, 1944, Serial No. 538,780

2 Claims. (Cl. 220—15)

This invention relates to refrigerating apparatuses and particularly to refrigerated ice cream storage cabinets and elements thereof.

It is now common practice to provide ice cream storage cabinets with a single square or rectangular refrigerated compartment as distinguished from prior structures wherein they were provided with a plurality of elongated cylindrical sleeve-like compartments. The reason for this change in ice cream cabinet structures is to permit small retail establishments to store ice cream and other packaged food products such as frozen meats, fish, fruits and berries at one end of the cabinet and cans or containers of bulk ice cream at the other end of the cabinet. When an elongated cylindrical can or container containing bulk ice cream is stored in a portion of a square or rectangularly shaped compartment of such cabinets it is a difficult task to dip or scoop ice cream from the bulk thereof in the can or container. This difficulty lies in the fact that when an attempt is made to dip or scoop ice cream from the container the container will rotate or spin within the compartment. My invention is therefore directed to the provision of improved means for preventing rotation or spinning of a can or container of bulk ice cream within a refrigerated compartment of a refrigerating apparatus during the act of dispensing ice cream therefrom.

An object of my invention is to provide an improved means or device for maintaining a cylindrical ice cream can in a predetermined position within a rectangularly shaped refrigerated compartment of a refrigerator cabinet and for holding the can against rotation therein so as to facilitate dipping or scooping of ice cream from the can.

A further object of my invention is to provide a rectangularly shaped device for holding a can against rotation within a compartment of a refrigerator cabinet which device may be slipped over the can to firmly grip the same prior to its insertion into the compartment and having its peripheral edges lying along and adapted to engage opposed walls of the compartment when the can is inserted thereinto.

In carrying out the foregoing objects it is a still further and more specific object of my invention to provide a low cost device of the character described that may, upon being damaged, be readily replaced by the user without any appreciable amount of expense to him.

Further objects and advantages of the present invention will be apparent from the following description, reference being had to the accompanying drawing, wherein a preferred form of the present invention is clearly shown.

In the drawing:

Fig. 1 is a top view of an ice cream cabinet with a portion of the lid broken away and showing an ice cream can held in place within the storage compartment thereof by a device of the present invention.

Fig. 2 is a sectional view of the cabinet shown in perspective and taken on the line 2—2 of Fig. 1.

Fig. 3 is a perspective view of the can holding device of the present invention.

Fig. 4 is an enlarged sectional view of the can holding device taken on the line 4—4 of Fig. 3; and Fig. 5 is an enlarged fragmentary sectional view taken on the line 5—5 of Fig. 1 showing the can gripping portion of the holding device distorted.

Referring to the drawing, for the purposes of illustrating my invention, I have shown in Fig. 1 thereof a refrigerating apparatus including a refrigerator cabinet of the ice cream or frozen food storage type generally represented by the reference character 10. Cabinet 10 comprises a plurality of opposed walls surrounding a substantially rectangularly shaped compartment 11 provided at its top with an opening which is normally closed by hinged together doors 12. The cabinet has an open top wall, an insulated bottom wall 13 and a plurality of upright insulated opposed end and side walls 14 (see Fig. 2). A metal liner 15 forms the inner surface of the walls 13 and 14 and this liner has a cooling element or refrigerant evaporator coil 16 secured thereto and embedded in the insulation of the walls about the liner. Cooling element or evaporator 16 is adapted to be connected in closed circuit relationship with a refrigerant condensing and liquifying unit (not shown) for circulating refrigerant thereto and therefrom. Evaporation of refrigerant in evaporator 16 withdraws heat from the storage compartment 11, through liner 15, to thereby cool the interior thereof.

A refrigerated storage cabinet having a square or rectangularly shaped compartment is more useful, especially in small retail stores, since it permits the storage of packaged frozen foods in one portion or end thereof as well as or in addition to a can or cans of bulk ice cream in another portion or end thereof. While I am aware of the fact that others have employed various devices for preventing rotation of round cans within such compartments these prior devices have been expensive and when they become damaged or ineffective they required the attention of an experienced service man to again render them effective. In most instances the repair or replacement of such prior devices resulted in the necessity of removing the contents of a low temperature compartment which is very detrimental to certain types of frozen foods because of the fact that such foods should not be permitted to thaw, prior to being consumed, and then refrozen. The device of my invention while accomplishing the purpose for which it is intended at a minimum of cost to the user of the refrigerator eliminates the necessity of calling a service man when the device becomes damaged.

The device in the present disclosure for preventing rotation of a can of bulk ice cream within a refrigerated compartment comprises a rectangularly shaped, in top plan view, sleeve member generally represented by the reference character 20. The device 20 is shown as being square in top plan view and slightly smaller than the distance between opposed walls of compartment 11. It is to be understood that the square form of device 20 comes within the definition of a rectangle. In Figs. 1 and 2 of the drawing the rectangular sleeve member 20 is shown surrounding or embracing an elongated cylindrical container or can 21 of conventional construction adapted to contain bulk ice cream and disposed in the refrigerated compartment 11 of cabinet 10. The sleeve member or device 20 is of tubular form in cross section and includes a bottom wall 22, a top wall 23 and upright side edges or walls 24 and 25 (see Figs. 3 and 4). Each opposed wall 22 and 23 of the tubular-like sleeve member 20 has a round opening 26 cut therein of a diameter slightly smaller than the diameter of a standard ice cream can. A plurality of perforations or slits 27 in walls 22 and 23 extend from the openings 26 to provide a series of fingers about the wall of openings 26. By slitting the walls of openings 26 of device 20 these walls are rendered resilient while the remainder of the device may be relatively stiff or rigid. Device or sleeve member 20 may be constructed of any suitable material and is herein disclosed as being formed of corrugated paper or so-called strawboard paper. The construction of device 20 comprises a flat outside sheet of paper 31, a flat inner sheet of paper 32 and a corrugated paper sheet 33 interposed between and spacing the papers 31 and 32 apart (see Fig. 4). The sleeve member is originally in strip form and is then folded, along three lines, into its tubular form with the ends of the various paper sheets abutted against one another at one corner of the device. A narrow strip of adhesive or gummed paper 35 may be secured along the one corner of the folded structure to maintain the same in its tubular formation.

A tubular sleeve member or device 20 is preferably adapted to be frictionally associated with an ice cream can or container 21 before the can is placed in the open top refrigerated compartment 11 of cabinet 10. In associating a device or a plurality of devices 20 with an ice cream can the openings 26 therein are aligned with an end of the can and the device 20 is then manually forced over this can end so that the resilient fingers provided by the perforations or slits 27 tightly or firmly grip the outer surface of the can about its circumference and at spaced apart points therealong. Due to the openings 26 being of slightly smaller diameter than the outer diameter of the ice cream can 21 the portions or fingers about the walls of openings 26 will be slightly distorted as shown in Fig. 5 of the drawings when frictionally associated with or embracing the can. Such deformation of device 20 when applied to a can is preferred because of the fact that a more firm gripping effect thereof with the can is obtained. The can 21 with one or more of the devices 20 located thereon is then lowered into the compartment 11. The side edges or upright walls 24 and 25 of device 20 lie along and may abut against liner 15 at opposed walls or sides of compartment 11. The rectangular form of the sleeve member or device 20 thereby prevents its being turned within compartment 11 and since the can is frictionally embraced thereby the can is maintained stationary with respect to the walls of compartment 11. Thus the can or container 21 is held against rotation or spinning during the act of dipping or scooping ice cream therefrom. By locating a device 20 adjacent the open top of a can of ice cream within compartment 11 it will also serve to prevent any small particles or chunks of ice cream falling from the dipper or scoop to the bottom of the compartment 11. These fallen chunks of ice cream may be readily removed from the ledge provided by device 20 and replaced into the can 21. Thus, the can holding device 20 in addition to preventing rotation of the can 21 also prevents ice cream from falling to the bottom of compartment 11 to thereby keep the interior of the compartment in a sanitary condition. A device or a plurality of devices 20 may be removed from the compartment 11 of cabinet 10 along with the can or container 21 therefrom. However, should a device or sleeve member 20 stick within the compartment 11, upon removing the can 21, it may be readily removed independently of the can.

While I have disclosed the ice cream can antirotating device as comprising a sleeve-like member having two horizontal walls and connecting vertical side walls with both horizontal walls frictionally embracing a can at spaced apart points it is to be understood that the device may take other forms. Also instead of making the device of paper or strawboard it may be constructed of other materials if desired. In either event however, the general rectangular form of the device, so that straight peripheral sides are provided to lie along and engage opposed walls of the compartment and the double or spaced apart can embracing portions of the device, for preventing rotation of the can through the frictional connection between the can and the device, are important.

It will be seen from the foregoing that I have provided an improved anti-can rotating device which cooperates with walls of a refrigerated compartment of a refrigerating apparatus to hold the can against spinning or rotation for facilitating the removal or dispensing of bulk ice cream from the apparatus. Due to the simplicity and cheapness of the anti-can rotating device herein disclosed the user of the refrigerating apparatus may keep a generous supply of them on hand and at any time that one should become damaged beyond further use it may be replaced at only a few cents cost to the user. My invention eliminates the necessity of providing mounting brackets or other obstructions along the inner surface of the walls of the refrigerated compartment for locating can holding devices therein and provides for the ready insertion and removal of a device of the character described by the user of the apparatus. By eliminating mounting brackets from the interior of a refrigerating compartment, ordinarily provided for more complicated and expensive anti-can rotating devices, the compartment is unobstructed and free to receive packaged frozen foods in uniform stacks.

While the form of embodiment of the invention as herein disclosed constitutes a preferred form, it is to be understood that other forms might be adopted, as may come within the scope of the claims which follow.

What is claimed is as follows:

1. A device for preventing a cylindrical container positioned in a refrigerated compartment having flat opposed walls from rotating as ice cream is dispensed from the container, said device, when in use, comprising a unitary member engaging said walls of the compartment and having spaced apart and connected together similar horizontal substantially rectangular walls, each of said spaced apart horizontal walls of said member being provided with an opening therein, the openings in said walls of said member being aligned with one another and having their edge portions embracing the cylindrical container at spaced apart points therealong, the openings in said walls of said member being uniform in diameter so that their edge portions will embrace the cylindrical container at a plurality of positions along the length thereof, and the openings in said walls of said member being smaller in diameter than the outer surface of the container whereby said edge portions thereof frictionally grip the container with such force that said member is removable from the compartment along with the container.

2. A device for preventing a cylindrical container positioned in a refrigerated compartment having flat opposed walls from rotating as ice cream is dispensed from the container, said device, when in use, comprising a unitary member having spaced apart and connected together similar horizontal walls each provided with opposed straight edges, the corresponding edges of said horizontal walls lying in vertical planes and engaging opposed walls of said compartment, each of said spaced apart horizontal walls of said member being provided with an opening therein, the openings in said walls of said member being aligned with one another and having their edge portions embracing the cylindrical container at spaced apart points therealong, the openings in said walls of said member being uniform in diameter so that their edge portions will embrace the cylindrical container at a plurality of positions along the length thereof, and the openings in said walls of said member being smaller in diameter than the outer surface of the container whereby said edge portions thereof frictionally grip the container with such force that said member is removable from the compartment along with the container.

JASPER A. SMITH.